US010721599B1

(12) United States Patent
Lim

(10) Patent No.: US 10,721,599 B1
(45) Date of Patent: Jul. 21, 2020

(54) DEVICE, SYSTEM AND METHOD FOR INTER-TALKGROUP SHARING

(71) Applicant: MOTOROLA SOLUTIONS, INC., Chicago, IL (US)

(72) Inventor: Bing Qin Lim, Jelutong (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/198,925

(22) Filed: Nov. 23, 2018

(51) Int. Cl.
*H04W 4/08* (2009.01)
*H04W 4/10* (2009.01)
*G06F 3/041* (2006.01)

(52) U.S. Cl.
CPC ............... *H04W 4/08* (2013.01); *H04W 4/10* (2013.01); *G06F 3/0416* (2013.01)

(58) Field of Classification Search
None
See application file for complete search history.

(56) References Cited

U.S. PATENT DOCUMENTS

| 10,129,711 | B1 | 11/2018 | Saadoun et al. | |
|---|---|---|---|---|
| 2007/0239824 | A1* | 10/2007 | Shaffer | H04L 29/06027 709/204 |
| 2013/0275883 | A1* | 10/2013 | Bharshankar | H04L 67/22 715/753 |
| 2014/0038668 | A1 | 2/2014 | Vasavada et al. | |

FOREIGN PATENT DOCUMENTS

EP 2571234 A1 3/2013

OTHER PUBLICATIONS

PCT/US2019/062171, Device, System and Method for Inter-Talkgroup Sharing, filed Nov. 19, 2019.
Brown, Aaron, "WhatsApp—How to forward a text, picture, video or file to another group: Express.co.uk", Jun. 20, 2016, retrieved from the Internet Feb. 20, 2020.
de Biolley, Luc, Examiner, "International Search Report", dated Feb. 28, 2020, issued in corresponding PCT Application No. PCT/US2019/062171, filed Nov. 19, 2019, Entitled: "Device, System and Method for Inter-Talkgroup Sharing".

* cited by examiner

*Primary Examiner* — Alejandro Rivero
(74) *Attorney, Agent, or Firm* — Perry + Currier, Inc.

(57) ABSTRACT

A device system and method for inter-talkgroup sharing is provided. A device comprises: a radio configured to communicate on a plurality of talkgroups; a talkgroup selector; a touchscreen display; and a controller. The controller is configured to: render, at the touchscreen display, an item associated with a first talkgroup, of the plurality of talkgroups; receive, at the touchscreen display, hold touch input at the item; receive, at the talkgroup selector, a selection of a second talkgroup, of the plurality of talkgroups; after the second talkgroup is selected, determine that the hold touch input has ended; and, in response, share, using the radio, the item in the second talkgroup.

16 Claims, 7 Drawing Sheets

DEVICE, SYSTEM AND METHOD FOR INTER-TALKGROUP SHARING

BACKGROUND OF THE INVENTION

Public safety personnel, such as police officers, often operate communication devices to communicate via a plurality of talkgroups, for example using push-to-talk communication devices. When a talkgroup is selected at a device, items (e.g. information and/or data and/or visual data) being shared with a selected and/or active talkgroup cannot be shared with another talkgroup without a lengthy cut-and-paste operation and/or a lengthy share operation using a share icon, and the like, which triggers a selection of a destination talkgroup from a menu, and the like. The length of time needed to implement such sharing may be unacceptable in mission critical operations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
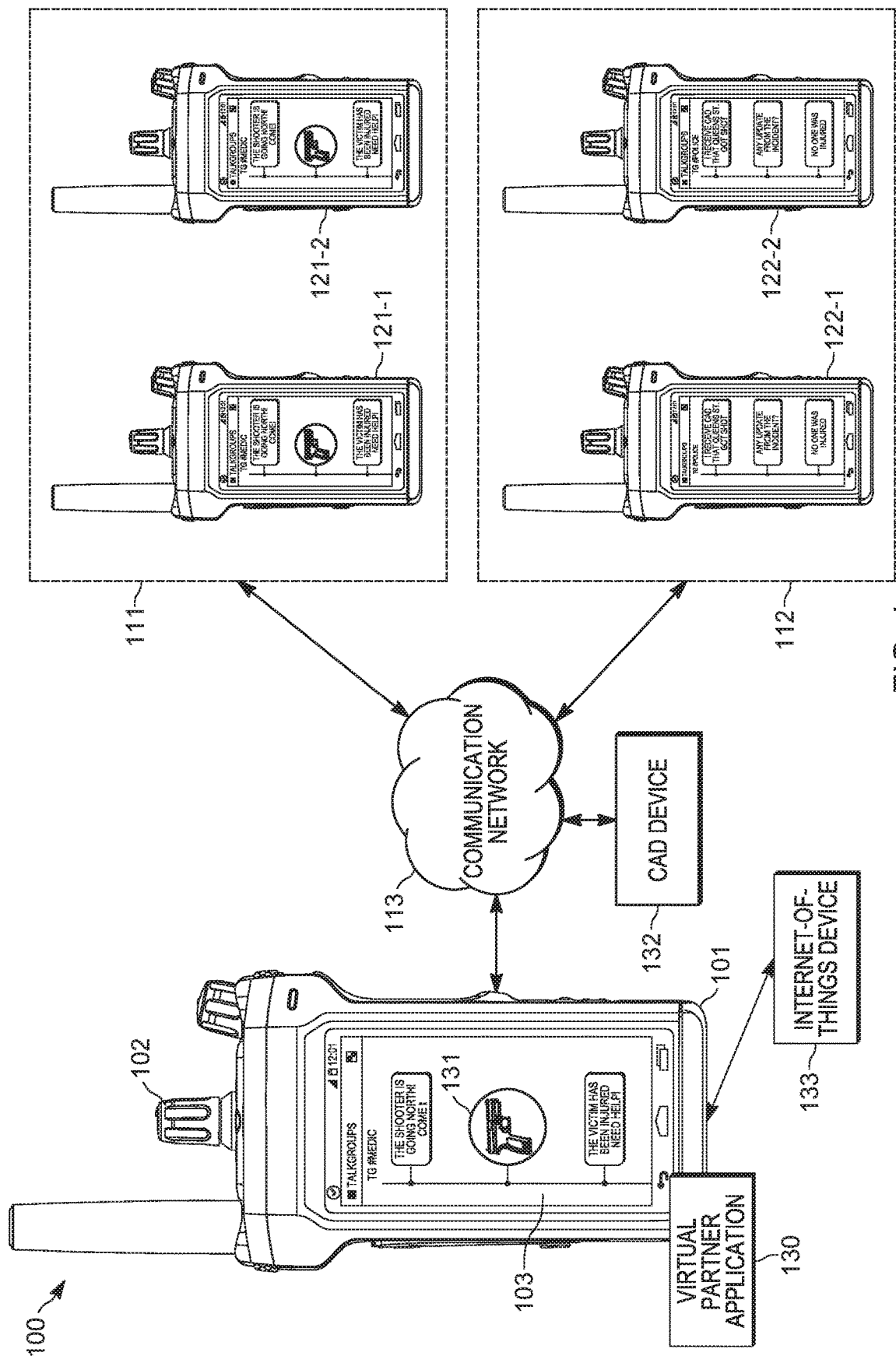
FIG. 1 is a system for inter-talkgroup sharing, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a radio configured to communicate on a plurality of talkgroups; a talkgroup selector; a touchscreen display; and a controller configured to: render, at the touchscreen display, an item associated with a first talkgroup, of the plurality of talkgroups; receive, at the touchscreen display, hold touch input at the item; receive, at the talkgroup selector, a selection of a second talkgroup, of the plurality of talkgroups; after the second talkgroup is selected, determine that the hold touch input has ended; and, in response, share, using the radio, the item in the second talkgroup.

Another aspect of the specification provides a method comprising: rendering, at a touchscreen display of a device, an item associated with a first talkgroup, of a plurality of talkgroups with which a radio of the device is configured to communicate; receiving, at the touchscreen display, hold touch input at the item; receiving, at a talkgroup selector of the device, a selection of a second talkgroup, of the plurality of talkgroups; after the second talkgroup is selected, determining, at a controller of the device, that the hold touch input has ended; and, in response, sharing, using the radio, the item in the second talkgroup Attention is directed to FIG. 1, which depicts an example system 100 for inter-talkgroup sharing, in accordance with some examples. The system 100 comprises a radio 101, which, as depicted, comprise a talkgroup selector 102 and a touchscreen display 103. As depicted, the radio 101 comprises a push-to-talk (PTT) radio, and the talkgroups selector 102 comprises a knob (and/or a button) at a top edge and/or top side of the radio 101. It is understood that the radio 101 otherwise comprises any suitable number of speakers, microphones, volume controls, antennas, PTT buttons and/or controls and/or communication components, and the like for communicating with other radios.

In particular, the radio 101 is configured to communicate on a plurality of talkgroups 111, 112 via a communication network 113 (interchangeably referred to hereafter as the network 113), and respective communication links therebetween (the communication links depicted in system 100 as double-headed arrows between components of the system 100).

For example, as depicted, the plurality of talkgroups 111, 112 includes a first talkgroup 111 and a second talkgroup 112, with each of the talkgroups 111, 112 comprising a plurality of respective radios. As depicted, the first talkgroup 111 comprises radios 121-1, 121-2 (interchangeable referred to hereafter, collectively, as the radios 121 and, generically, as a radio 121), and the second talkgroup 112 comprises radios 122-1, 122-2 (interchangeable referred to hereafter, collectively, as the radios 122 and, generically, as a radio 122). While communication links are respectively depicted between the talkgroups 111, 112 and the network 113, it is understood that such communication links represent respective communication links between each of the radios 121, 122 and the network 113. Furthermore, while the radios 121, and the radios 122, are depicted as being co-located, the radios 121, and the radios 122 are understood to be in any suitable location. As further depicted in FIG. 1, each of the radios 121, 122 are similar to the radio 101, and while specific components of the radios 121, 122 are not labelled, it is understood that the radios 121, 122 may each comprise a respective talkgroup selector and touchscreen, and other components for communicating over talkgroups. However, in other examples, one or more of the radios 121, 122 may have a different format and/or configuration from the radio 101.

The radio 101 is understood to be a member of both talkgroups 111, 112, and furthermore while each of the talkgroups 111, 112 are depicted with only two radios 121, 122 (or three including the radio 101), each of the talkgroups 111, 112 may comprises any suitable number of radios. Furthermore while only two talkgroups 111, 112 are depicted, the system 100 may comprise any suitable number of talkgroups with the radio 101 also configured to communicate over any suitable number of talkgroups. Furthermore, while each of the radios 121, 122 are depicted as communicating over only one of the talkgroups 111, 112, each of the radios 121, 122 may communicate over any suitable number of talkgroups (e.g. one or more of the radios 121 may be configured to communicate over the second talkgroup 112, and/or one or more of the radios 122 may be configured to communicate over the first talkgroup 111).

However, regardless of the number of talkgroups 111, 112 and/or radios 101, 121, 122, only one of the talkgroups 111, 112 may be "selected" and/or "current" and/or "active" at the radio 101 and/or the touchscreen display 103 at a given time. For example, the talkgroup selector 102 may be operated by an operator of the radio 101 to select a talkgroup 111, 112, of a plurality of talkgroups, and the touchscreen display 103 may be controlled to provide and/or render items from that selected talkgroup (e.g. as received at the radio 101 and transmitted to the radios of the selected talkgroup and/or as received from the radios of the selected talkgroup).

As depicted, for example, the first talkgroup 111 is a selected talkgroup at the radio 101, and hence items associated with the first talkgroup 111 are provided at the touchscreen display 103. However, while the first talkgroup 111 is selected, the radio 101 may continue to receive items associated with the second talkgroup 112 (e.g. in the background).

For example, as depicted, the first talkgroup 111 that is selected at the radio 101 comprises a "# Medic" talkgroup and items from the first talkgroup 111 are provided at the touchscreen display 103 in a timeline format, for example, in a timeline application and/or messaging application. As depicted, the items of the first talkgroup 111 comprise text and graphics. The text of the first talkgroup 111 may be received as text messages (e.g. either via the touchscreen display 103 and/or as received from the radios 121 of the first talkgroup 111), text generated from a speech-to-text application and/or an optional virtual partner application 130, and the like. For example, voice may be received at the radio 101 over the first talkgroup 111 and converted to text by the virtual partner application 130, and the like, and provided in the timeline format of a timeline application and/or messaging application associated with the first talkgroup 111.

Similarly, the graphics the first talkgroup 111 may comprise a graphic associated with an incident detected by the radio 101, and/or shared in the first talkgroup 111 as metadata, text, and the like, and which may be converted to a representative graphic. For example, as depicted, a graphic 131 of the first talkgroup 111 comprises a gun icon that may represent a gun shot incident, and the like, which may be detected in communications in the first talkgroup 111 via the virtual partner application 130, and/or received from one of the radios 121 of the first talkgroup 111. For example, the virtual partner application 130, and the like, may detect a phrase "Gun Shot Detected At Queens St. at 2:34 am" in verbal communications in the first talkgroup 111, and convert the phrase to the graphic 131; metadata comprising the text of the phrase "Gun Shot Detected At Queens St. at 2:34 am" may be associated with the graphic 131. Alternatively, the radio 101 may receive incident data and/or an incident report of a shots fired incident, and the like, from a computer aided dispatch (CAD) device 132 (e.g. in communication with the radios 101, 121, 122 via the network 113), and the like, which is provided as the graphic 131.

However, the items of the first talkgroup 111 may comprise any suitable items that may be shared in talkgroups. As depicted, for example, the radio 101 is depicted as being in communication with an optional internet-of-things device 133, such as a video camera, and the like, and which may be specifically associated with the first talkgroup 111. As such, the items of the first talkgroup 111 may include, but are not limited to: a conversation log of the first talkgroup 111; text; video; internet-of-things data, received, in the first talkgroup, from an internet-of-things device 133 associated with the first talkgroup 111; virtual partner data, received, in the first talkgroup 111, from the virtual partner application 130 associated with the first talkgroup 111; a graphic; and metadata associated with the graphic (e.g. the phrase and/or incident data used to generate the graphic, and the like).

As depicted, the first talkgroup 111 is also selected at the radios 121, and hence the items of the first talkgroup 111 are also depicted at respective touchscreens of the radios 121.

However, the second talkgroup 112 is selected at the radios 122, and hence, items of the second talkgroup 112 are depicted at respective touchscreens of the radios 122. As depicted, the second talkgroup 112 that is selected at the radios 122 comprises a "# Police" talkgroup and items (e.g. text) from the second talkgroup 112 are provided at the respective touchscreen displays in a timeline format, for example, in a timeline application and/or messaging application.

While each of the talkgroups 111, 112 are depicted as providing respective items in similar applications (e.g. timeline applications and/or messaging applications), such applications need not be the same application. For example, the first talkgroup 111 may provide respective items in a first messaging application, and the second talkgroup 112 may provide respective items in a second messaging application different from the first messaging application. In particular, the first messaging application of the first talkgroup 111 may comprise a messaging application used for medics (and maintained, for example, by a medic entity), while the second messaging application of the second talkgroup 111 may comprise a messaging application used for police (and maintained, for example, by a police entity), and which may use different formats for providing items at the touchscreen display 103. In particular, in further examples, an application that is associated with the talkgroup 111 (and which is rendered at the touchscreen display 103 when the talkgroup 111 is selected) can be different type of application than an application associated with the talkgroup 112 (and which is rendered at the touchscreen display 103 when the talkgroup 112 is selected); for example, a messaging application may be associated with the talkgroup 111 while a timeline application may be associated with the talkgroup 112.

As will be explained hereafter, according to the present specification, items may be conveniently shared between the talkgroups 111, 112, at the radio 101. For example, when the first talkgroup 111 is initially selected at the radio 101, the radio 101 may: receive, at the touchscreen display 103, hold touch input at an item of the first talkgroup 111; receive, at the talkgroup selector 102, a selection of the second talkgroup 112; after the second talkgroup 112 is selected, determine that the hold touch input has ended; and, in response, share the item in the second talkgroup 112.

Figure 2:
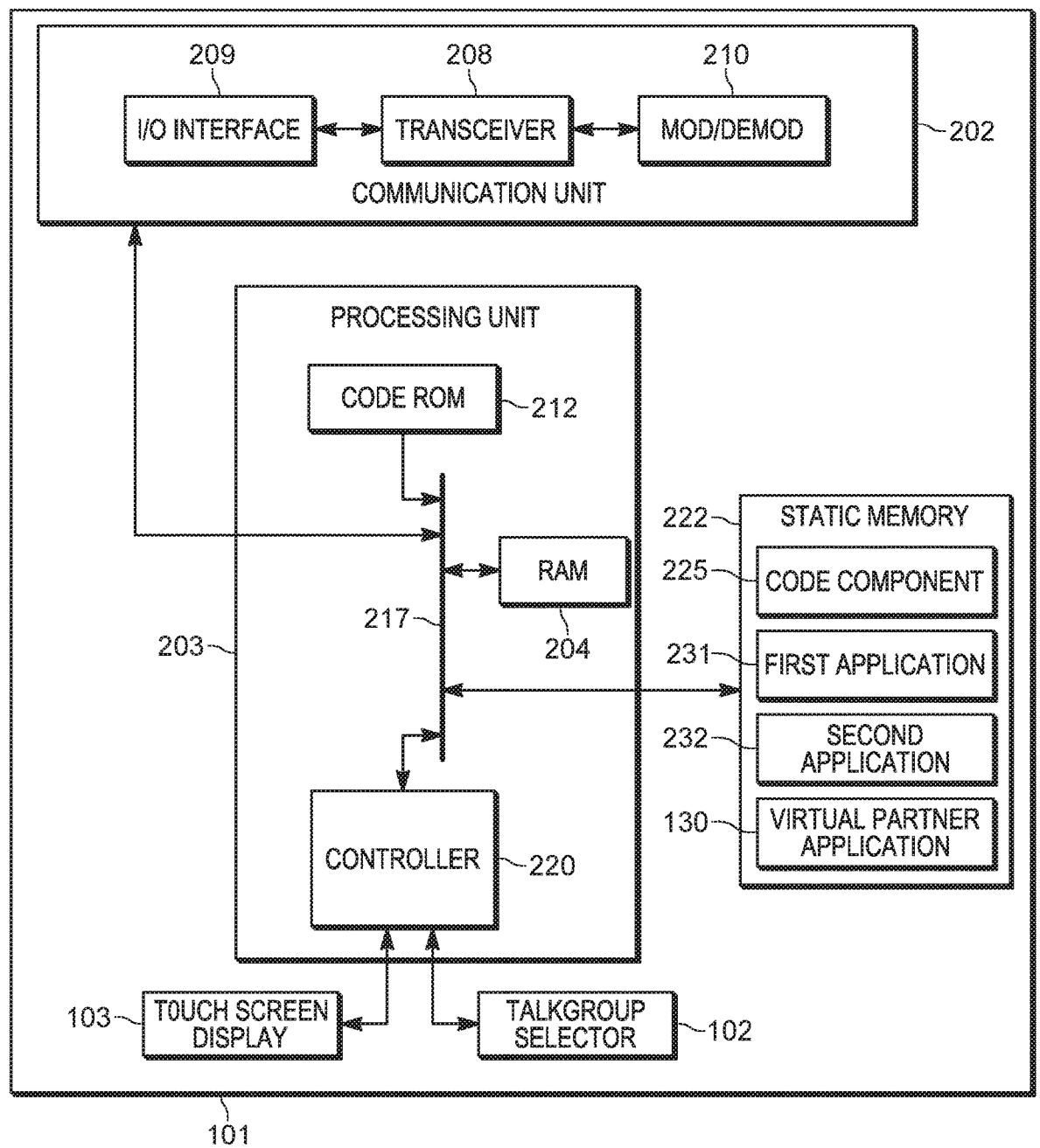
FIG. 2 is a device diagram showing a device structure of a radio for inter-talkgroup sharing, in accordance with some examples.

Attention is next directed to FIG. 2, which depicts a schematic block diagram of an example of the radio 101. Each of the radios 121, 122 may be similar to the radio 101 as depicted in FIG. 2, however one or more of the radios 121, 122 may be different from the example radio 101 depicted in FIG. 2.

In general, the radio 101 comprises: the talkgroup selector 102, the touchscreen display 103, a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one code component 225 and, as depicted, a first application 231, a second application 232 and the virtual partner application 130. While not depicted, the radio 101 may further comprise any suitable number of speakers, microphones, volume controls, antennas, PTT buttons and/or controls and/or communication components, and the like for communicating with other radios.

As shown in FIG. 2, the radio 101 includes the communications unit 202 coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 is generally configured to communicate on a plurality of talkgroups (e.g. the talkgroups 111, 112) and may include one or more wired and/or wireless input/output (I/O) interfaces 209 that are configurable to communicate with other radios 121, 122 via the network 113 (and, when present, the internet-of-things device 133). For example, the communication unit 202 may include one or more transceivers 208 and/or wireless transceivers (e.g. wireless radios, and the like) including, but not limited to: an LTE (Long-Term Evolution) transceiver and/or other types of GSM (Global System for Mobile communications) transceivers, a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), a Worldwide Interoperability for Microwave Access (Wi-MAX) transceiver, for example operating in accordance with an IEEE 802.16 standard, and/or another similar type of wireless transceiver.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

In other words, the network 113 may comprise any of a plurality of different types of wireless and/or wireless networks, and the communications unit 202 (and/or the wireless transceivers 208 and/or a wireless radio thereof) is adapted accordingly to communicate via the network 113.

The controller 220 may include ports (e.g. hardware ports) for coupling to other hardware components (e.g. the talkgroup selector 102, the touchscreen display 103, and the like).

As described above, the talkgroup selector 102 may comprise one or more of a button and a knob, and/or any suitable type of selecting device.

The touchscreen display 103 comprises any suitable type of flat panel display, and the like, which has been adapted to include a touchscreen including, but not limited to, a resistive touchscreen, a capacitive touchscreen, an infrared touchscreen, and the like. The touchscreen display 103 may further be adapted for use with fingers of the operator, gloved fingers of the operator (and/or such gloves may be adapted for use with touchscreens), styluses, and the like.

However, the talkgroup selector 102 may generally be located at the radio 101 at a location which allows an operator of the radio 101 to interact with the touchscreen display 103 using a first hand, and operate the talkgroup selector 102 with a second hand. As such, the touchscreen display 103 may be located at a front surface of the radio 101, such that the radio 101 may be held by the operator using a first hand, with a finger (including, but not limited to a thumb) of the first hand interacting with the touchscreen display 103, while the talkgroup selector 102 may be located at a top edge and/or top side of the radio 101 for operation by a second hand of the operator, for example without first hand and the second hand interfering with each other while the first hand interacts with the touchscreen display 103 and the second hand operates the talkgroup selector 102.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the radio 101 is not a generic controller and/or a generic device, but a device specifically configured to implement functionality for inter-talkgroup sharing. For example, in some examples, the radio 101 and/or the controller 220 specifically comprises a computer executable engine configured to implement functionality for inter-talkgroup sharing.

Hence, while in the example of FIG. 2, only one processing unit 203 and one controller 220 is depicted, in other examples, the radio 101 may include more than one processing unit 203 and/or more than one controller 220, and such processing units and/or controllers may be application specific. For example, the radio 101 may include a baseband processor configured to control talkgroup activities and interact with (and/or control) the communication unit 202; and the radio 101 may further comprise an application processor configured to process applications (e.g. the code component 225 and the applications 130, 232, 232), and touchscreen control operations. In these examples, both the baseband processor and the application processor may communicate with each other to implement inter-talkgroup sharing functionality.

Each of the memories 212, 222 comprise non-transitory memories and/or non-transitory computer readable mediums. In particular, the static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the radio 101 as described herein are maintained, persistently, at the memory 222 and used by the controller 220, which makes appropriate utilization of volatile storage during the execution of such programming instructions.

Figure 3:
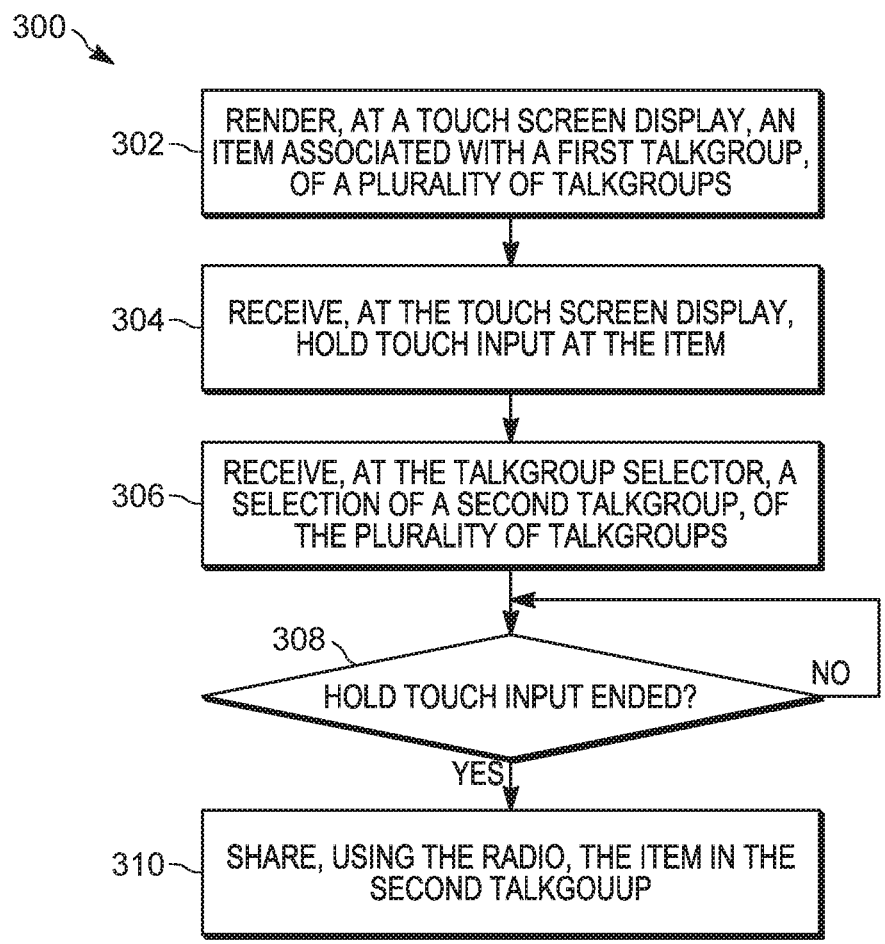
FIG. 3 is a flowchart of a method for inter-talkgroup sharing in accordance with some examples.

In particular, the memory 222 stores instructions corresponding to the code component 225 that, when executed by the controller 220, enables the controller 220 to implement functionality for inter-talkgroup sharing including, but not limited to, the blocks of the method set forth in FIG. 3. In illustrated examples, when the controller 220 executes the code component 225, the controller 220 is enabled to: render, at the touchscreen display 103, an item associated with a first talkgroup 111, of a plurality of talkgroups;

receive, at the touchscreen display 103, hold touch input at the item; receive, at the talkgroup selector 102, a selection of a second talkgroup 112, of the plurality of talkgroups; after the second talkgroup 112 is selected, determine that the hold touch input has ended; and, in response, share, using the communication unit 202 (e.g. a wireless transceiver 208), the item in the second talkgroup 112.

In particular, hold touch input may comprise touch input detected at the touchscreen display 103 where an item is determined to be selected as long as the item continues to be touched and/or "held". A hold touch input may occur for longer than a tap touch input, for example, where an item is briefly tapped, for example to "play" an item (e.g. a video and/or to convert text to speech, and the like). For example, an operator of the radio 101 may touch an item at the touchscreen display 103 (using, for example, a finger, a gloved finger, a stylus, and the like) with the item being selected for as long as the item is touched and/or "held". In one example, as long as an item is touched at the touchscreen display 103, and a finger, and the like, that touches the item has not been lifted from the item (e.g. the item remains touched), when the talkgroup selector 102 is operated and/or turned, then the selected item continues to be designated as "held" and hence selected for sharing between the talkgroups 111, 112.

As depicted, the memory 222 further stores a first application 231, such as a timeline application, a messaging application, and the like, used to provide items at the touchscreen display 103 in the first talkgroup 111. Similarly, the memory 222 further stores a second application 232, such as a timeline application, a messaging application, and the like, used to provide items at the touchscreen display 103 in the second talkgroup 112, the first application 231 and the second application 232 may be different from one another, and which may use different formats to render and/or provide items at the touchscreen display 103. However, in other examples, a single application may be used to provide items at the touchscreen display 103 in both talkgroups 111, 112.

As depicted, the memory 222 further stores the virtual partner application 130, which may be optional. When present, the virtual partner application 130 may be used to assist the operator of the radio 101 to implement various functions including, but not limited to translating speech to text, and/or text to speech, and/or other any other suitable type of virtual partner functionality. In one example, the virtual partner application 130 assist in one or more of: collecting sensor data (e.g. from sensors of the radio 101 and/or of sensors with which the radio 101 is in communication with, such sensors at the internet of things device 133); summarizing talkgroup conversations; determining an emergency (and/or public safety) incident and/or situation and/or context based on one or more of: the sensor data, talkgroup conversations etc.; receiving a query from one or more users in a talkgroup (e.g. operators of the radios 101, 121, 122) and providing responses and/or answer to the queries. The virtual partner application 130 may communicate with an operator of the radio 101 via one or more of: audio output (e.g. via a speaker at the radio 101); and visual output at the touchscreen display 103. In some examples, the virtual partner application 130 communicates information associated with a given talkgroup when the given talkgroup is selected and is associated with the virtual partner application 130; for example, the virtual partner application 130 may be associated with some, but not all, of the talkgroups with which the radio 101 is associated.

While the applications 130, 231, 232 are depicted as being distinct from the code component 225, in other examples, one or more of the applications 130, 231, 232 may be components of the code component 225.

The virtual partner application 130 (and/or the code component 225) may further comprise machine learning and/or deep-learning based algorithms trained to implement functionality of the radio 101. Such machine learning and/or deep-learning based algorithms may include, but are not limited to, one or more of: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm and/or deep learning algorithm is within the scope of present examples.

While the radio 101 is specifically depicted in the present application as a PTT radio, the radio 101 may comprise any suitable device for inter-talkgroup sharing which includes a radio (e.g. such as the transceiver 208) configured to communicate on a plurality of talkgroups, a talkgroup selector (such as the talkgroup selector 102), and a touchscreen display (such as the touchscreen display 103); in other words, according to the present specification, devices for inter-talkgroup sharing may comprise formats other than a PTT radio and furthermore may be mobile or non-mobile. For example, such devices may include, but are not limited to, CAD devices (e.g. the CAD device 132, which may not be mobile), handheld mobile devices (e.g. including smart phones, and the like), vehicle devices (e.g. vehicle radios, and the like), and the like. Such a devices are generally configured to: render, at a touchscreen display, an item associated with a first talkgroup, of a plurality of talkgroups; receive, at the touchscreen display, hold touch input at the item; receive, at a talkgroup selector, a selection of a second talkgroup, of the plurality of talkgroups; after the second talkgroup is selected, determine that the hold touch input has ended; and, in response, share, using the radio, the item in the second talkgroup.

Attention is now directed to FIG. 3, which depicts a flowchart representative of a method 300 for inter-talkgroup sharing. The operations of the method 300 of FIG. 3 correspond to machine readable instructions that are executed by the radio 101, and specifically the controller 220 of the radio 101. In the illustrated example, the instructions represented by the blocks of FIG. 3 are stored at the memory 222 for example, as the code component 225. The method 300 of FIG. 3 is one way in which the controller 220 and/or the radio 101 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 renders, at the touchscreen display 103, an item associated with a first talkgroup 111, of a plurality of talkgroups. For example, the first talkgroup 111 may be a selected and/or current and/or active talkgroup, with the first application 231 being opened and used to provide items of the first talkgroup 111 at the touchscreen display 103.

At a block 304, the controller 220 receives, at the touchscreen display 103, hold touch input at the item. For example, an operator of the radio 101 may touch and hold an item at the touchscreen display 103, and the controller 220 may detect such a touch and hold interaction as hold touch input received at a corresponding region of the touchscreen display 103.

At a block 306, the controller 220 receives, at the talkgroup selector 102, a selection of a second talkgroup 112, of the plurality of talkgroups.

In some examples, the controller 220 may be further configured to, when the selection of the second talkgroup 112 is received: open an application (e.g. the second application 232) associated with the second talkgroup 112; and render, at the touchscreen display 103, the item in the application. For example, while the radio 101 may be receiving items of the second talkgroup 112 while the first talkgroup 111 is selected, the second application 232 may not be opened until the second talkgroup 112 is selected.

In particular, the controller 220 may be further configured to: render, at the touchscreen display 103, the item associated with the first talkgroup 111 using the first application 231 associated with the first talkgroup 111, the hold touch input received at the touchscreen display 103 as the item is rendered using the first application 231; and, when the selection of the second talkgroup 112 is received: open the second application 232 associated with the second talkgroup 112; convert the item from a first format associated with the first application 231 to a second format associated with the second application 232; and render, at the touchscreen display 103, the item in the second application 232 in the second format. Such examples will be described in further detail below with respect to FIG. 4A, FIG. 4B, FIG. 4C and FIG. 4D.

In yet further examples, the touchscreen display 103 may be controlled to provide a representation of moving and/or sharing the item from the first talkgroup 111 to the second talkgroup 112. For example, the controller 220 may be further configured to: render, at the touchscreen display 103, the item associated with the first talkgroup 111, in a first view representing the first talkgroup 111; and when the selection of the second talkgroup 112 is received, control the touchscreen display 103 to change from the first view, representing the first talkgroup 111, to a second view, representing the second talkgroup 112. Such examples will be described in further detail below with respect to FIG. 4A, FIG. 4B, FIG. 4C and FIG. 4D.

At a block 308, the controller 220, after the second talkgroup 112 is selected, determines whether the hold touch input has ended. When the hold touch input has not ended (e.g. a "NO" decision at the block 308), the controller 220 continues to implement the block 308). When the hold touch input ends (e.g. a "YES" decision at the block 308), at a block 310, the controller 220, in response, shares, using the communication unit 202 (e.g. a wireless transceiver 208 and/or a radio), the item in the second talkgroup 112.

In some examples, the controller 220 is further configured to: when the item is shared with the second talkgroup 112, convert the item from a first format, associated with the first talkgroup 111, to a second format, associated with the second talkgroup 112. For example, the item may be converted from a format of the first application 231 to a format of the second application 232. In particular, in some examples, the controller 220 may be further configured to share, using a wireless transceiver 208 (and/or a radio), the item in the second talkgroup 112 by: transmitting, using wireless transceiver 208 (and/or a radio), the item in the second talkgroup 112 in a format associated with the second talkgroup 112. For example, the controller 220 may convert the selected item to a format of the second application 232 and transmit the selected item in this format.

Examples of such conversion may include, but are not limited to: converting a graphic to metadata associated with the graphic, or vice versa; converting text and/or video to audio and/or speech; converting audio and/or speech to text; and the like.

In yet further examples, the controller 220 may be further configured to, when the item is shared with the second talkgroup 112: convert the item to an audio format; and play the item in the audio format in the second talkgroup 112. Such conversion of the item to an audio format may be independent of converting the item from a format associated with the first talkgroup 111 and/or the first application 231, to a format associated with the second talkgroup 112 and/or the second application 232.

For example, in some examples, the virtual partner application 130 may provide audio in the second talkgroup 112 for descriptive explanation, elaboration, notification and/or summarization of the item in the second talkgroup 112 using natural language processing, through speakers of the radios 122 so that the operators of the radios 122 in the talkgroup 112 are notified of the item without having to view and/or look at the touchscreen displays of the radios 122.

In yet further examples, the controller 220 may be further configured to, after the item is shared with the second talkgroup 112, one of: continue to communicate with the first talkgroup 111; and change to communicating with the second talkgroup 112. For example, after sharing the item, the controller 220 may one of: continue to communicate with the first talkgroup 111 as the selected and/or current and/or active talkgroup; or designate the second talkgroup 112 as the selected and/or current and/or active talkgroup. Whether the controller 220 continues to communicate with the first talkgroup 111 or changes to communicating with the second talkgroup 112 may be configurable at the radio 101 (e.g. using a menu system, and the like) and/or may be determined using the virtual partner application 130 and/or a machine learning application as based on a context of the radio 101 (e.g. a talkgroups 111, 112 associated with a higher priority incident, and the like, may be automatically selected, after the sharing) and/or past behavior of the operator interacting with the radio 101 when sharing items between the talkgroups 111, 112, and the like.

Attention is next directed to FIG. 4A, FIG. 4B, FIG. 4C and FIG. 4D which depicts a sequence in which the radio 101 is implementing the method 300.

Figure 4A:
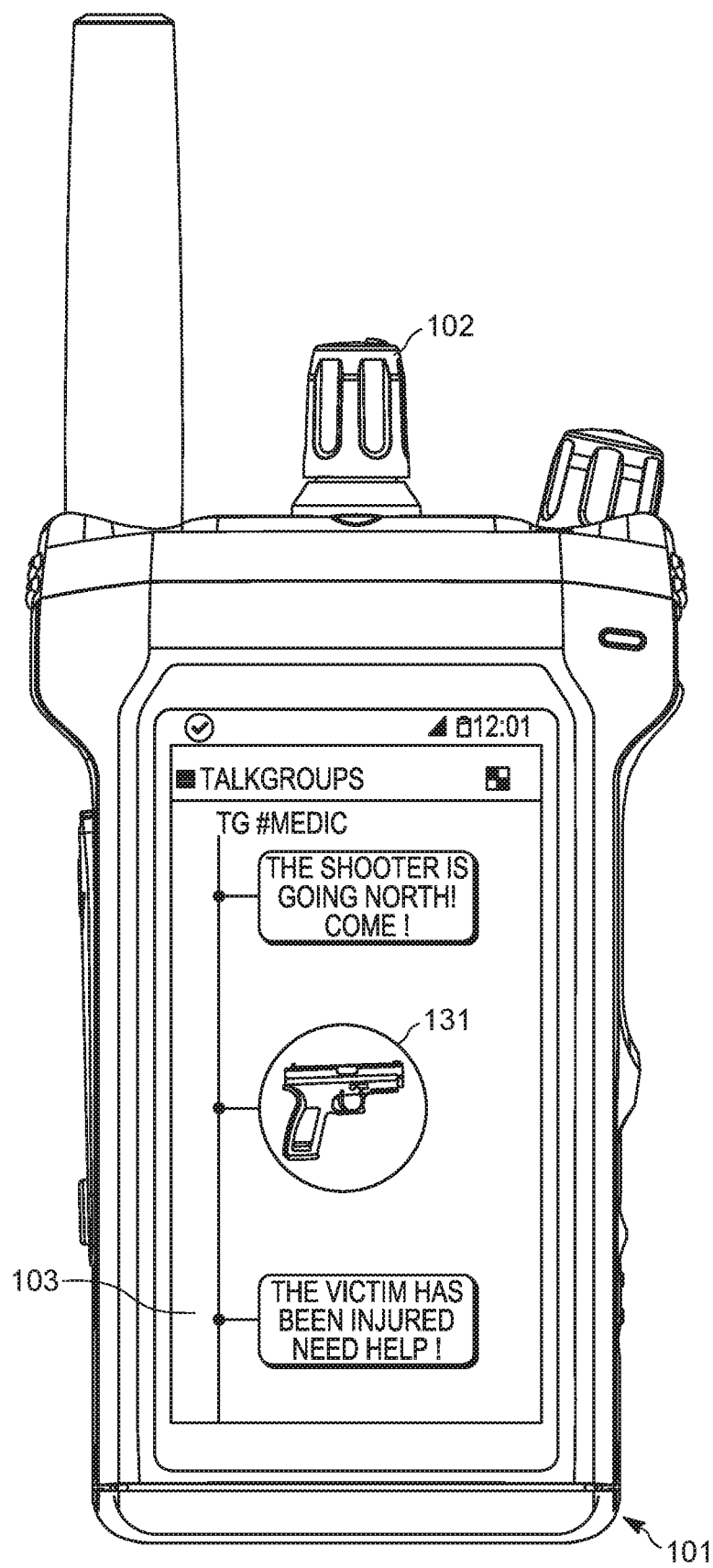
FIG. 4A, FIG. 4B, FIG. 4C and FIG. 4D depict an example of a method for inter-talkgroup sharing being implemented at a radio in accordance with some examples.

Beginning with the FIG. 4A, the radio 101 is rendering (e.g. at the block 302 of the method 300), at the touchscreen display 103, items associated with the first talkgroup 111, including the graphic 131, for example using the first application 231. In particular, the items associated with the first talkgroup 111 are provided at the touchscreen display 103 in a first view representing the first talkgroup 111 (e.g. using the first application 231 associated with the first talkgroup 111). FIG. 4A is generally similar to the radio 101 as depicted in FIG. 1.

Figure 4B:
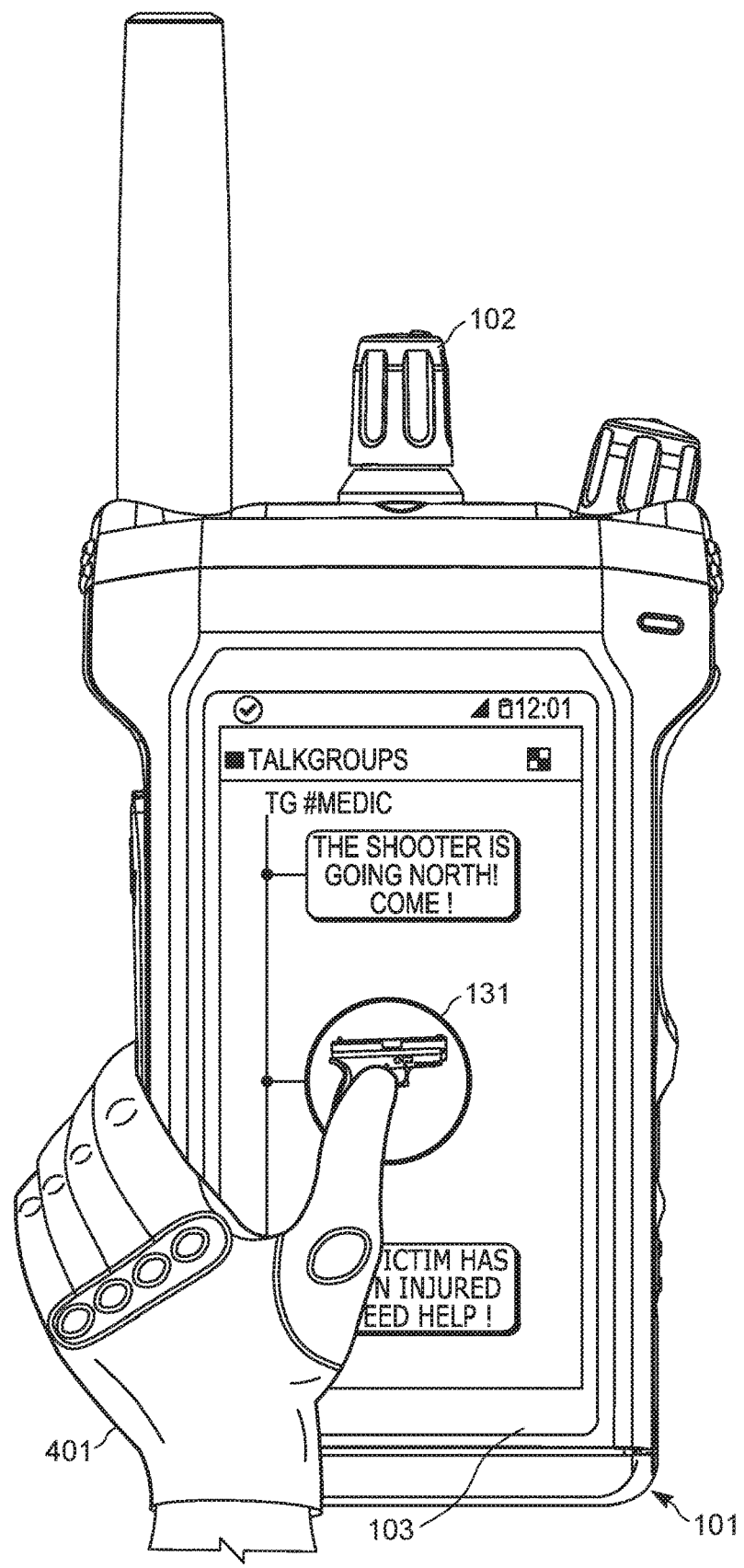

In FIG. 4B, which follows in time from FIG. 4A, a thumb of a first hand 401 of an operator of the radio 101 (e.g. now holding the radio 101 in the first hand 401, the first hand 401, a depicted, being gloved) interacts with the touchscreen display 103 to touch and hold the graphic 131. As such, the radio 101 (e.g. at the block 304) receives, at the touchscreen display 103, hold touch input at the graphic 131. In particular, in this example, the graphic 131 is the item to be shared from the first talkgroup 111 to the second talkgroup 112.

Figure 4C:
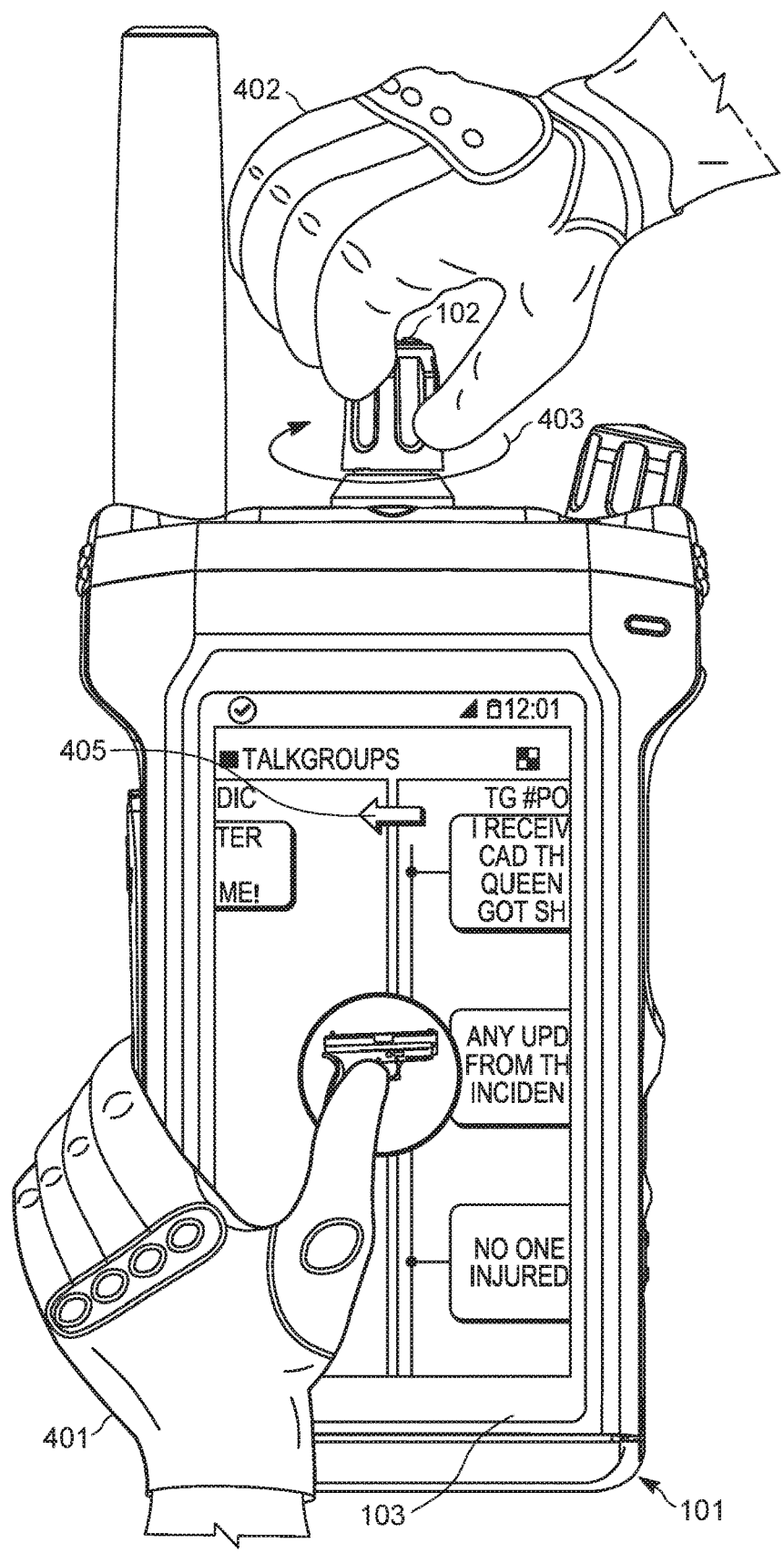

In FIG. 4C, which follows in time from FIG. 4B, a second hand 402 of an operator of the radio 101 operates the talkgroup selector 102 to select the second talkgroup 112, while the thumb of the first hand 401 continues to hold the graphic 131. For example, as depicted, the talkgroup selector 102 comprises a knob, and the operator of the radio 101 may turn and/or rotate the talkgroup selector 102 (as represented by the arrow 403) with their second hand 402 to cause the radio 101 to receive (e.g. at the block 306 of the method 300), at the talkgroup selector 102, a selection of the second talkgroup 112.

As also depicted in FIG. 4C, when the selection of the second talkgroup 112 is received, the touchscreen display 103 is controlled to change from the first view representing the first talkgroup 111 (e.g. as also seen in FIG. 4A and FIG. 4B) to a second view representing the second talkgroup 112. For example, as depicted, as the talkgroup selector 102 is operated and/or rotated, the first view of the first talkgroup 111 moves and/or "slides" off of the touchscreen display 103 and is replaced by the second view of the second talkgroup 112, for example in an animated and/or smooth manner, as represented by the arrow 405. However, as the second view replaces the first view, the graphic 131 appears to remain stationary and/or moves to the second view of the second talkgroup 112 as the second view of the second talkgroup 112 moves on to the touchscreen display 103 (e.g. from a side of the touchscreen display 103).

Hence, as depicted in FIG. 4C, the radio 101 receives, at the talkgroup selector 102, the selection of the second talkgroup 112, while continuing to receive the hold touch input at the graphic 131 (e.g. the graphic 131 remains stationary while the first view of the first talkgroup 111 moves off of the touchscreen display 103 and is replaced by the second view of the second talkgroup 112, the first view moving off the touchscreen display 103 at an opposite side opposite from where the second view appears).

Figure 4D:
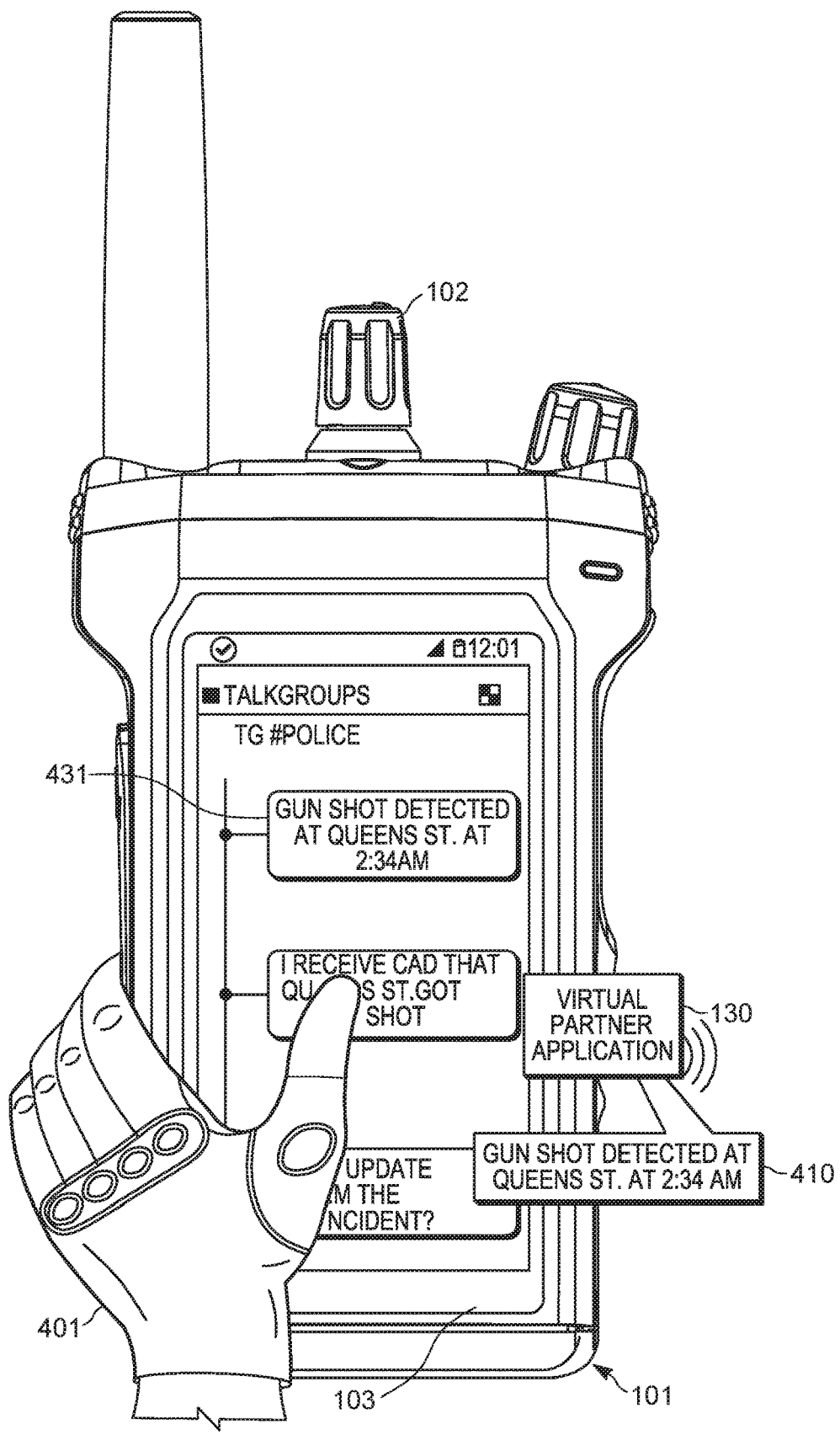

In FIG. 4D, which follows in time from FIG. 4C, after the second talkgroup 112 is selected (e.g. the talkgroup selector 102 is no longer being operated), the operator of the radio 101 releases the graphic 131, for example by letting go of the graphic 131 with their thumb. Hence, the radio 101 determines that the hold touch input has ended (e.g. a "YES" decision at the block 308). As such, the radio 101 shares (e.g. at the block 310) the graphic 131 in the second talkgroup 112 which, as depicted, includes converting the graphic 131 to text 431 (e.g. "Gun Shot Detected At Queens St. at 2:34 am") which may comprise the metadata associated with the graphic 131. For example, the second application 232 may not be compatible with the graphic 131 (and/or graphics in general) and, as such, the graphic 131 is converted to a textual format using the metadata associated with the graphic 131. However, in other examples, the graphic 131 may be shared in the second talkgroup 112 without converting to the text 431, and the like.

As further depicted, the virtual partner application 130, and the like, may convert the metadata associated with the graphic 131 to an audio format and "play" the audio at the radio 101: as depicted, the radio 101 is emitting sound 410 "Gun Shot Detected At Queens St. at 2:34 am". Such a conversion to audio may be optional and/or may be independent of the conversion of the graphic 131 to the text 431.

While not depicted, the graphic 131 and, the like, is further transmitted (e.g. using the network 113) to each of the radios 122 in the second talkgroup 112 (e.g. which then appear similar to the radio 101 as depicted in FIG. 4D). Similarly, the audio format of the graphic 131 may also be transmitted to the radios 122 in the second talkgroup 112 such that the audio format of the graphic 131 is emitted from the radios 122 in the second talkgroup 112; hence, in these examples, the operators of the radios 122 in the second talkgroup 112 may be notified of the shared graphic 131 (and/or any other shared item) without looking at the touchscreen displays of the radios 122.

While, in FIG. 4D, the second talkgroup 112 remains selected, in other examples, once the graphic 131 is shared in the second talkgroup 112, the radio 101 may revert back to the first talkgroup 111 as a selected and/or current talkgroup, and again show the view of the first talkgroup 111 depicted in FIG. 4A.

In some examples, the operator of the radio 101 (e.g. while operating the radio 101 as in FIG. 4B or FIG. 4C) may interact with the touchscreen display 103 to perform a predefined touch input (for example, a swipe up or swipe down while holding the graphic 131) to cancel the inter-talkgroup sharing operation, in case the operator change their mind about sharing the graphic 131, the radio 101 being further configures to cancel inter-talkgroup sharing of items when the predefined touch input is received. In other words, when the predefined touch input is received at any of the block 304, the block 306, and the block 308 (e.g. prior to a "YES" decision) of the method 300, the method 300 ends and the block 310 is not implemented, and hence a "held" item is not shared to the second talkgroup 112 (or any other selected talkgroup).

Hence, provided herein is a device, system and method for inter-talkgroup sharing in which items are shared between talkgroups using a device at which an item in a first talkgroup is selected using a hold touch input at a touchscreen display, while a talkgroup selector is operated to share the item from the first talkgroup to the second talkgroup. The item is shared when the second talkgroup is selected and the hold touch input ends.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A device comprising:
   a radio configured to communicate on a plurality of talkgroups;
   a physical knob;
   a touchscreen display; and
   a controller configured to:
      render, at the touchscreen display, an item associated with a first talkgroup, of the plurality of talkgroups, the item rendered, at the touchscreen display, in a first view representing the first talkgroup;
      receive, at the touchscreen display, hold touch input at the item;
      receive, via rotation of the physical knob, a selection of a second talkgroup, of the plurality of talkgroups;
      when the selection of the second talkgroup is received, control the touchscreen display to replace the first view, representing the first talkgroup, to a second view, representing the second talkgroup, the item remaining stationary at the touchscreen display as the second view of the second talkgroup moves on to the touchscreen display;
      after the second talkgroup is selected, determine that the hold touch input has ended; and, in response, share, using the radio, the item in the second talkgroup.

2. The device of claim 1, wherein the controller is further configured to:
   when the item is shared with the second talkgroup, convert the item from a first format, associated with the first talkgroup, to a second format, associated with the second talkgroup.

3. The device of claim 1, wherein the controller is further configured to, when the selection of the second talkgroup is received:
   open an application associated with the second talkgroup; and
   render, at the touchscreen display, the item in the application.

4. The device of claim 1, wherein the controller is further configured to:
   render, at the touchscreen display, the item associated with the first talkgroup using a first application associated with the first talkgroup, the hold touch input received at the touchscreen display as the item is rendered using the first application; and, when the selection of the second talkgroup is received:

open a second application associated with the second talkgroup;
convert the item from a first format associated with the first application to a second format associated with the second application; and
render, at the touchscreen display, the item in the second application in the second format.

5. The device of claim 1, wherein the controller is further configured to share, using the radio, the item in the second talkgroup by:
transmitting, using the radio, the item in the second talkgroup in a format associated with the second talkgroup.

6. The device of claim 1, wherein the controller is further configured to, after the item is shared with the second talkgroup, one of:
continue to communicate with the first talkgroup; and
change to communicating with the second talkgroup.

7. The device of claim 1, wherein the controller is further configured to, when the item is shared with the second talkgroup:
convert the item to an audio format; and
play the item in the audio format in the second talkgroup.

8. The device of claim 1, wherein the item comprises one or more of:
a conversation log of the first talkgroup;
text;
video;
internet-of-things data, received, in the first talkgroup, from an internet-of-things device associated with the first talkgroup;
virtual partner data, received, in the first talkgroup, from a virtual partner application associated with the first talkgroup;
a graphic; and
metadata associated with the graphic.

9. A method comprising:
rendering, at a touchscreen display of a device, an item associated with a first talkgroup, of a plurality of talkgroups with which a radio of the device is configured to communicate, the item rendered, at the touchscreen display, in a first view representing the first talkgroup;
receiving, at the touchscreen display, hold touch input at the item;
receiving, via rotation of a physical knob of the device, a selection of a second talkgroup, of the plurality of talkgroups;
when the selection of the second talkgroup is received, controlling the touchscreen display to replace the first view, representing the first talkgroup, to a second view, representing the second talkgroup, the item remaining stationary at the touchscreen display as the second view of the second talkgroup moves on to the touchscreen display after the second talkgroup is selected, determining, at a controller of the device, that the hold touch input has ended; and, in response,
sharing, using the radio, the item in the second talkgroup.

10. The method of claim 9, further comprising:
when the item is shared with the second talkgroup, converting the item from a first format, associated with the first talkgroup, to a second format, associated with the second talkgroup.

11. The method of claim 9, further comprising, when the selection of the second talkgroup is received:
opening an application associated with the second talkgroup; and
rendering, at the touchscreen display, the item in the application.

12. The method of claim 9, further comprising:
rendering, at the touchscreen display, the item associated with the first talkgroup using a first application associated with the first talkgroup, the hold touch input received at the touchscreen display as the item is rendered using the first application; and, when the selection of the second talkgroup is received:
opening a second application associated with the second talkgroup;
converting the item from a first format associated with the first application to a second format associated with the second application; and
rendering, at the touchscreen display, the item in the second application in the second format.

13. The method of claim 9, further comprising sharing, using the radio, the item in the second talkgroup by:
transmitting, using the radio, the item in the second talkgroup in a format associated with the second talkgroup.

14. The method of claim 9, further comprising, after the item is shared with the second talkgroup, one of:
continuing to communicate with the first talkgroup; and
changing to communicating with the second talkgroup.

15. The method of claim 9, further comprising, when the item is shared with the second talkgroup:
converting the item to an audio format; and
playing the item in the audio format in the second talkgroup.

16. The method of claim 9, wherein the item comprises one or more of:
a conversation log of the first talkgroup;
text;
video;
internet-of-things data, received, in the first talkgroup, from an internet-of-things device associated with the first talkgroup;
virtual partner data, received, in the first talkgroup, from a virtual partner application associated with the first talkgroup;
a graphic; and
metadata associated with the graphic.

* * * * *